United States Patent
Plesh, Sr.

(10) Patent No.: US 6,679,634 B2
(45) Date of Patent: Jan. 20, 2004

(54) LOW MAINTENANCE EASILY CHANGEABLE BEARING

(76) Inventor: Ronald L. Plesh, Sr., 31 Hemlock Hill, Orchard Park, NY (US) 14127

( * ) Notice: Subject to any disclaimer, the term of this patent is extended or adjusted under 35 U.S.C. 154(b) by 121 days.

(21) Appl. No.: 09/736,965

(22) Filed: Dec. 14, 2000

(65) Prior Publication Data

US 2002/0076126 A1 Jun. 20, 2002

(51) Int. Cl.$^7$ .............................................. F16C 43/06
(52) U.S. Cl. ...................... 384/510; 384/463; 384/542; 301/105.1
(58) Field of Search ................................ 384/454, 462, 384/463, 474, 543, 544, 542, 428, 585, 589, 510, 559, 537; 301/105.1

(56) References Cited

U.S. PATENT DOCUMENTS

| | | | | |
|---|---|---|---|---|
| 1,213,090 A | * | 1/1917 | Fox .............................. | 384/454 |
| 2,197,499 A | * | 4/1940 | Heinze ........................ | 384/454 |
| 2,208,724 A | * | 7/1940 | Griswold .................... | 384/454 |
| 3,198,735 A | * | 8/1965 | Lamson et al. ............. | 384/463 |
| 3,920,292 A | * | 11/1975 | Haussels .................... | 384/454 |
| 4,082,381 A | | 4/1978 | Simmons et al. ........... | 384/472 |
| 4,129,343 A | * | 12/1978 | Janssen ...................... | 384/558 |
| 4,492,415 A | * | 1/1985 | Baile et al. ................. | 384/463 |
| 4,534,871 A | | 8/1985 | Johnson | |
| 4,705,490 A | * | 11/1987 | Lindenthal ................. | 384/455 |
| 4,906,110 A | | 3/1990 | Van Wyk et al. | |
| 5,156,378 A | * | 10/1992 | Harken et al. .............. | 384/454 |
| 5,212,995 A | | 5/1993 | Robinson et al. .......... | 384/454 |
| 5,232,289 A | * | 8/1993 | Ito .............................. | 384/454 |
| 5,302,032 A | * | 4/1994 | Niwa et al. ................. | 384/454 |
| 5,328,252 A | | 7/1994 | Thompson | |
| 5,486,052 A | | 1/1996 | Sibley et al. | |
| 5,507,094 A | | 4/1996 | Lederman | |
| 5,507,961 A | | 4/1996 | Forster et al. | |
| 5,520,467 A | | 5/1996 | Nojima et al. | |
| 5,600,867 A | | 2/1997 | Niwa et al. | |
| 5,709,482 A | * | 1/1998 | Lutz ........................... | 384/434 |
| 5,845,997 A | | 12/1998 | Kinno et al. | |
| 5,951,173 A | * | 9/1999 | Matsui et al. .............. | 384/544 |
| 5,988,891 A | | 11/1999 | Yamamoto et al. | |
| 6,007,251 A | | 12/1999 | Hayashida et al. | |
| 6,020,072 A | | 2/2000 | Weydt et al. | |
| 6,029,538 A | | 2/2000 | Little et al. | |

OTHER PUBLICATIONS

NEVER–SEEZ, Product Selector Chart Lubricating Compounds, Nov. 1997.*

"Cobra Solid Lubricants for Bearings", brochure of Unique Technologies Associates.

* cited by examiner

Primary Examiner—Jack Lavinder
Assistant Examiner—Thomas J. Williams
(74) Attorney, Agent, or Firm—James C. Simmons (57) ABSTRACT

A bearing cartridge which is constructed not to be disassembled for re-packing with grease or otherwise and which may be quickly and easily replaced in the field. For high temperature applications such as sinter or pellet car wheels, the bearing cartridge is lubricated by a high temperature solid lubricant, and the rolling elements preferably comprise cylindrical rolling elements for bearing radial loads and spherical rolling elements for bearing axial loads. For ultra high temperature applications such as furnace car wheels, the bearing cartridge is lubricated by a ultra high temperature lubricant composed of a graphite and molydenum paste. In order to economically provide small furnace car bearing cartridges, a two-piece bearing cartridge is provided with rolling elements, preferably having cylindrical central portions for bearing radial loads and conically shaped axially outer end portions for bearing axial loads, between the races, the rolling elements insertable by means of a feeder slot.

17 Claims, 4 Drawing Sheets

LOW MAINTENANCE EASILY CHANGEABLE BEARING

The present invention relates generally to bearings and more particularly to rolling element bearings such as ball bearings.

In an aluminum plant (as well as other plants such as steel plants and ceramic and brick manufacturing plants), metal is transported for treatment into a furnace or heat treatment oven by a furnace car which, like a train, is typically mounted on flanged rollers for driving along rails. A furnace car may typically remain in a furnace for as much as 24 hours or longer under ultra high temperatures which are typically in the range of 700 to 1100 degrees F. As used in this application and the claims, the term "ultra high temperature" is meant to refer to a temperature in the range of about 700 to 1100 degrees F., and the term "ultra high temperature bearing" is meant to refer to a bearing which is used in an application wherein the bearing is normally subjected to an ultra high temperature.

Sinter cars are used to transport sinter (raw material for steel) which is heat treated as the sinter car transports the sinter some 300 feet. A sinter car wheel has two rolling surfaces, i.e., one used as a guide for the car, similar to a train wheel, and the other which is engaged by a sprocket which empties the car. Sinter car wheels as well as pellet car wheels experience high temperatures in the range of about 250 to 650 degrees F. The furnace car wheels for bottom car furnaces, wherein the top of the car becomes the bottom of the furnace when the car is pulled into position, also experience such high temperatures since the wheels are insulated from the ultra high furnace temperatures. As used in this application and the claims, the term "high temperature" is meant to refer to a temperature in the range of about 250 to 650 degrees F., and the term "high temperature bearing" is meant to refer to a bearing which is used in an application wherein the bearing is normally subjected to a high temperature. Sinter and pellet car wheel bearings are also subjected to high contamination from dust and the like as well as high temperature. The seals are often inadequate against the onslaught of contaminants with the result that the grease in the bearings is quickly rendered ineffective.

In both furnace and sinter and pellet car wheel bearings, the high or ultra high temperature melts the grease, causing it to come out of the bearing, or bakes the grease out. As a result of these harsh environmental conditions, conventional furnace and sinter and pellet car wheel bearings must regularly (perhaps each time used) be re-greased through a grease fitting and must often, due to contamination of the grease, be taken apart, cleaned up, and repacked with fresh grease, consuming much down-time and labor, at great expense.

It is accordingly considered desirable to provide a bearing which is low maintenance, i.e., it can withstand high or ultra high temperature over its life without the necessity of taking it apart and repacking it with lubricant.

The outer races for conventional bearings for furnace and sinter and pellet car wheels typically have diameters up to about 8 inches. The inner and outer races of such conventional bearings typically have thin cross-sections, i.e., on the order of ⅛ to ¼ inch. Bearing assemblies having such conventional bearings normally require a very tight or press fit between a bearing race and the shaft or housing in order to adequately support the bearing race. These special fits require high precision machining of either the shaft or housing to operate properly. The fits actually control the size and roundness of the races, effecting the running clearance of the assembly. These tight fits also require special tools and a great deal of care to prevent misalignment and to prevent surface damage to either the bearing or the shaft about which it is being mounted. In addition, after a period of time when the changing of the bearing is required, it is often difficult to remove the bearing, and special tools are often required therefor. The replacing of such a conventional bearing in the field, when required such as when a bearing has worn out, is thus a difficult process which may typically require as much as 6 hours. This work, which also requires special tools and/or special expertise, is thus considered more appropriate for skilled factory technicians than for workers in the field.

It is therefore also considered desirable to provide a bearing which in the field may be easily removed from and mounted to a wheel and axle without the need for special tools or special expertise.

Bearings having conventional tapered (conically shaped) rollers to bear against both radial and axial forces may tend to wear out quickly due to their inadequacy in handling axial loads, i.e., they are limited in the ability to handle high axial shocks.

It is accordingly an object of the present invention to provide a bearing which is low maintenance at high or ultra high temperature usage, i.e., it requires no repacking with grease during its useful life.

It is a further object of the present invention to provide a bearing which in the field may be easily removed from and mounted to a wheel and axle without the need for special tools or special expertise.

It is still another object of the present invention to provide such a bearing which has long life.

It is a further object of the present invention to provide an inexpensive, easy to manufacture, reliable bearing which has a minimum of parts.

In order to provide a low maintenance bearing which in the field may be easily removed from and mounted to a wheel and axle without the need for special tools or special expertise, in accordance with the present invention, the bearing is assembled as a cartridge with thick races and with a solid lubricant between the races.

In order to provide increased life to the bearing, it is provided with cylindrical rollers for bearing radial loads and with balls or spherical elements for handling axial loads.

In order to provide an inexpensive, easy to manufacture, reliable bearing which has a minimum of parts, in accordance with the present invention, the bearing is provided as two parts, i.e., an inner race and an outer race, with rolling elements therebetween, and a feeder slot is provided for loading the rolling elements between the inner and outer races.

The above and other objects, features, and advantages of the present invention will be apparent in the following detailed description of the preferred embodiments thereof when read in conjunction with the accompanying drawings wherein the same reference numerals denote the same or similar parts throughout the several views.

DETAILED DESCRIPTION OF THE PREFERRED EMBODIMENTS

Figure 1:
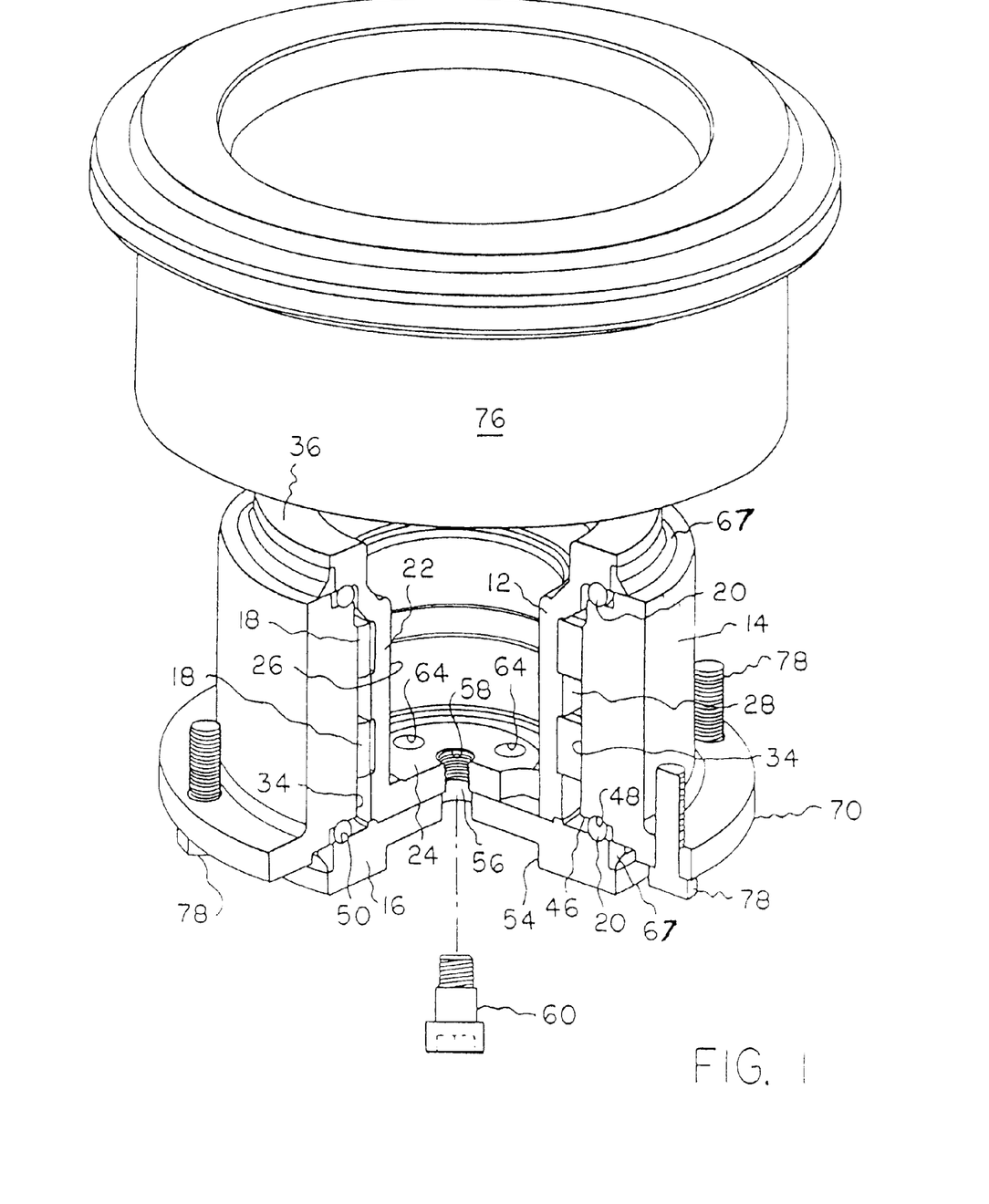
FIG. 1 is a perspective view with a portion cut away for clarity of illustration of a bearing in accordance with the present invention in position for mounting to a wheel of a sinter car.
Figure 2:
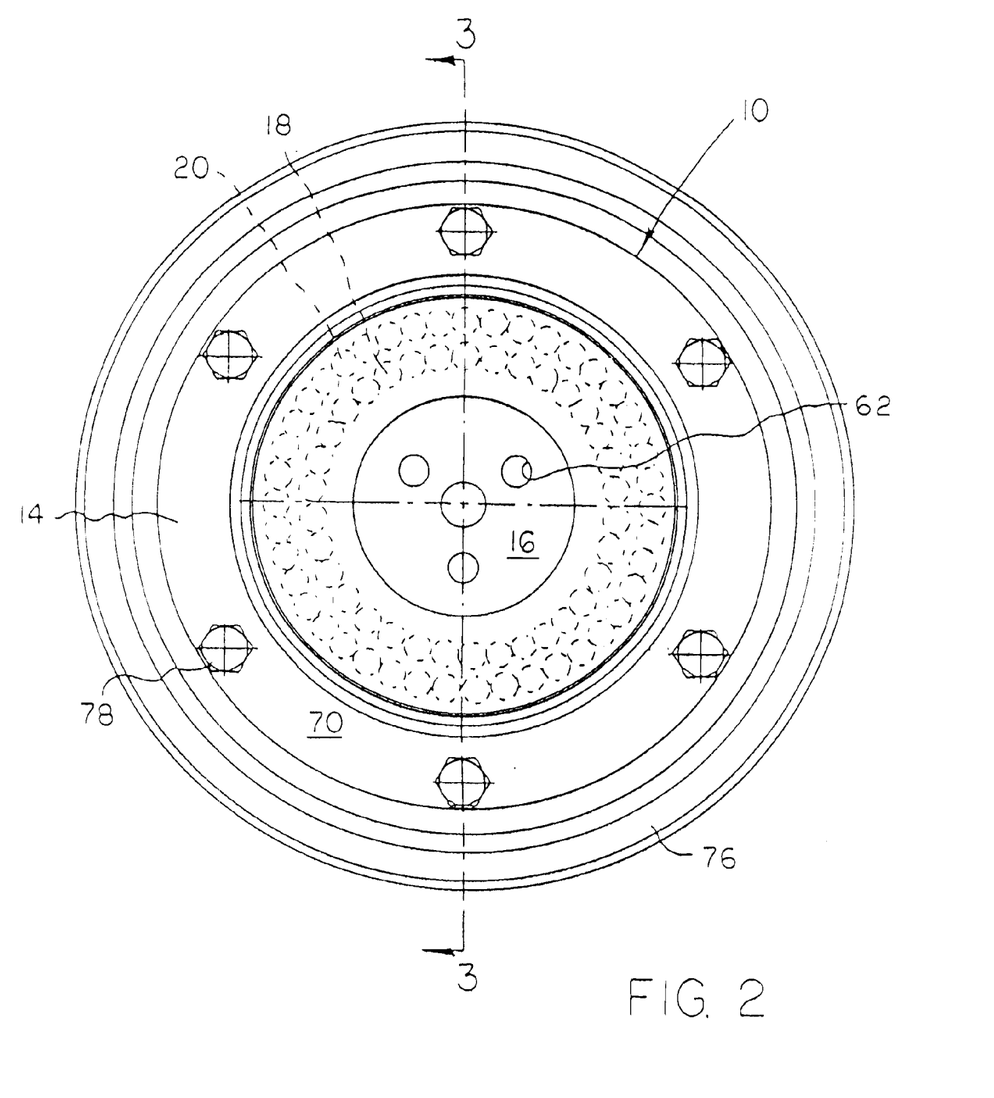
FIG. 2 is an end view of the bearing mounted to the wheel.
Figure 3:
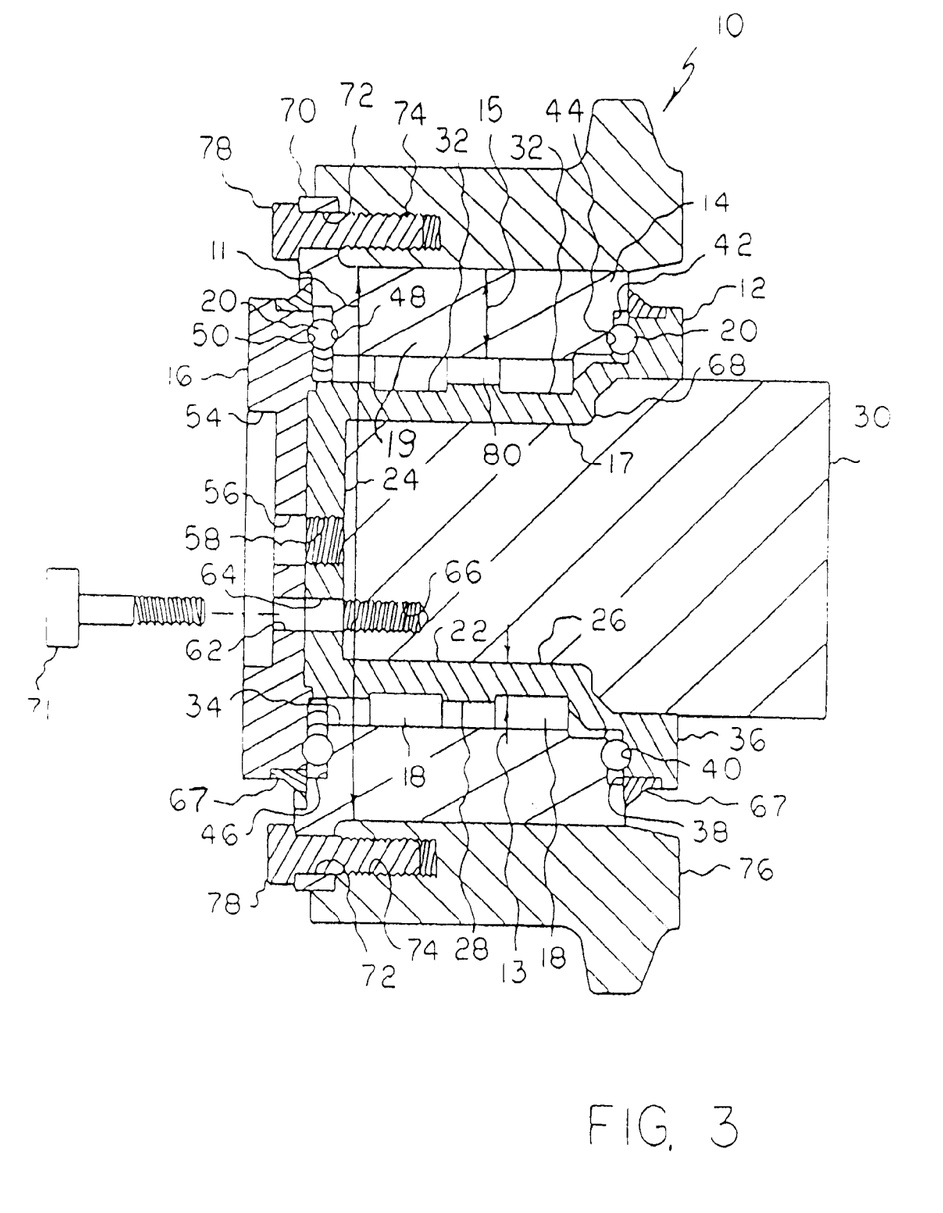
FIG. 3 is a sectional view thereof taken along line 3—3 of FIG. 2 and also showing an axle mounted thereto.

Referring to FIGS. 1 to 3, there is shown generally at 10 a bearing having an inner race 12, an outer race 14, and an end plate 16. This bearing 10 may be used for a sinter or pellet car wheel, wherein high temperatures may be experienced.

Tapered (conically shaped) rolling elements for bearing both radial and axial loads tend to wear out quickly when subjected frequently to high axial shocks due to the difficulty of tapered rolling elements handling such shocks. In order to provide greater capacity to handle high axial shocks as well as high radial loads and thus provide increased bearing life, in accordance with a preferred embodiment of the present invention, the bearing 10 is provided with a plurality of cylindrical rolling elements 18 between and around the circumference of the inner and outer races 12 and 14 respectively for bearing radial loads and a plurality of ball or spherical rolling elements 20 between the outer race 14 and the inner race/end plate (as hereinafter discussed) and around the circumference of the outer race 14 for bearing axial loads.

The inner race 12 is a rotatable member having a generally cylindrical portion 22 and a flat portion 24 extending across the axially outer end of the cylindrical portion 22. The cylindrical portion 22 has a generally cylindrical (axially extending) outer surface 28 and also has a generally cylindrical (axially extending) inner surface 26, which is suitably shaped, including a lead chamfer, illustrated at 68, to receive an axle 30. An end of the axle 30 abuts against flat portion 24. A pair of axially spaced indents or troughs 32 in the outer surface 28 extend circumferentially over the entire circumference of the inner race 12 to rotatably receive and guide the cylindrical rollers 18, which, as shown in FIG. 2, are generally in line contact one with another in each of the indents 32. The cylindrical rollers 18 are retained in the precision troughs 32 and rotatably bear against a generally cylindrical (axially extending) surface 34 of the outer race 14 to thus bear high radial loads, both shock and steady.

The axially inner end portion 36 of the inner race 12 extends radially outwardly beyond the surface 28 and radially overlaps the outer race 14 to define a radially extending surface 38 which has a groove or trough 40 therein extending circumferentially thereabout. The radially overlapped portion of the outer race 14 is notched to provide a corresponding radially extending surface 42 which has a corresponding groove or trough 44 therein extending circumferentially thereabout. The grooves 40 and 44 receive and guide balls 20 for rotation thereof therein for bearing high axial load, both shock and steady, the balls being generally in point contact one with another around the circumference of the bearing 10, as seen in FIG. 2.

The outer race 14 is similarly notched in its axially outer end to define a radially extending surface 46 which has a groove or trough 48 extending circumferentially thereabout. Another groove or trough 50 is defined in the axially inner radially extending surface 52 of the end cap 16 and extends circumferentially thereabout. The grooves 48 and 50 receive and guide balls 20 for rotation thereof therein for bearing high axial load, both shock and steady, the balls being generally in point contact one with another around the circumference of the bearing 10, as seen in FIG. 2.

The outer race 14 has an outer diameter, illustrated at 11, which is dictated by the wheel size and is conventionally less than about 8 inches. In the embodiment illustrated, the diameter 11 is, for example, about 8 inches. As previously discussed, the inner and outer races of such sized conventional bearings typically have thin cross-sections, i.e., on the order of ⅛ to ¼ inch. This requires a very tight or press fit between a bearing race and the shaft or housing in order to adequately support the bearing race. These special fits require high precision machining of either the shaft or housing to operate properly. These tight fits also require special tools and a great deal of care to prevent misalignment and to prevent surface damage to either the bearing or the shaft about which it is being mounted. In addition, after a period of time when the changing of the bearing is required, it is often difficult to remove the bearing, and special tools are often required therefor. The replacing of such a conventional bearing in the field, when required such as when a bearing has worn out, is thus a difficult process which may typically require as much as 6 hours. This work, which also requires special tools and/or special expertise, is thus considered more appropriate for skilled factory technicians than for workers in the field. In order for the bearing 10 to be easily removed from and mounted to a wheel and axle in the field without the need for special tools or special expertise, in accordance with the present invention, the inner and outer races 12 and 14 respectively are each of sufficient thickness (in the generally cylindrical portions thereof which engage the cylindrical rolling elements 18 and which therefore bear radial load) as to have the rigidity to be self-supporting so that very tight or press fits between the bearing races and the shaft and housing respectively are not required. Thus, the radial load bearing portion, illustrated at 17 and 19 respectively, of each of the inner and outer races 12 and 14 respectively has a thickness, illustrated at 13 and 15 respectively, of at least about ½ inch. For example, thicknesses 13 and 15 may be about ½ inch and 1½ inch respectively. The rigidity may be enhanced by steps in the races.

The end cap 16 has a central circular recess, illustrated at 54. Located centrally of this recess 54 is an aperture, illustrated at 56, which aligns with a threaded aperture, illustrated at 58, in the inner race 12, and a screw 60 is received in aperture 56 and threadedly engages aperture 58 to keep the end plate 16 connected to the inner race 12 to hold the bearing together prior to its attachment to the axle 30 as discussed hereinafter.

A plurality of, for example, 3 circumferentially spaced apertures 62 are provided in the end plate within the recess 54, and apertures 64 alignable therewith are provided in the inner race 12. The axle 30 contains in its end surface threaded apertures 66 which are alignable with apertures 62 and 64. The axle 30 is attached to the bearing 10 by inserting screws 71 in the aligned apertures 62 and 64 and threadedly engaging threaded apertures 66 respectively in the axle 30.

For removal of the bearing 10 from the axle 30, the screw 60 may be replaced with a longer screw (not shown) to act as a jack screw, i.e., to bear and apply force against the end of the axle 30.

At 67 are illustrated suitable seals, which are desirably high temperature and highly resistant to contamination. For example, the seals 67 may be Viton roto-seals, a product marketed by Sealmor Industries of Columbus, Ohio.

A locking plate or cover (not shown) for the screws 60 and 71 may be provided to insure that the axle mounting screws 71 do not work loose and, if a grease is used, to retain the grease in the bearing.

Unlike tapered bearing elements which may act as a wedge and bind if the races are tightened too much, the balls 20 and rolling elements 18 will not normally skew on tightening the races. There is thus no need to set bench lateral clearance.

The axially outer end of the outer race 14 has a flange 70 which contains a plurality of, for example, 6 apertures, illustrated at 72, spaced circumferentially thereabout. These apertures 72 are alignable with threaded apertures, illustrated at 74, in a flanged roller or wheel 76. The outer race 14 is receivable in the wheel, and with the apertures 72 and 74 respectively aligned, hex head screws 78 or other suitable fasteners are received in the apertures 72 respectively and are threadedly engaged in the apertures 74 to attach the wheel 76 to the outer race 14 of the bearing 10. Lock washers (not shown) are desirably provided for screws 78.

In accordance with the present invention, the assembly of the thick inner and outer races 12 and 14 respectively, the end plate 16, and rolling elements 18 and 20 forms a bearing cartridge which has sufficient rigidity so that a tight fit is not required between the races and the structure to which they are attached and which thus allows quick mounting such as to wheel 76 and axle 30 merely by (1) inserting screws 71 into apertures 62 and 64 of the end plate 16 and inner race 12 respectively and threadedly into axle apertures 66 respectively and suitably tightening and (2) inserting screws 78 into apertures 72 respectively of the outer race 14 and threadedly into wheel apertures 74 respectively and suitably tightening. This allows the bearing 10 to be easily replaced in the field. Thus, the races 12 and 14 and elements 18 are assembled into a cartridge which is self-supporting and may be bolted on to an axle 30 and wheel 76 of the car. For the purposes of this specification and the claims, the term "cartridge" is meant to refer to a bearing which is sufficiently rigid that it may be bolted on (by means of screws or bolts) to an axle and wheel or otherwise suitably mounted thereto such as by loosely slip fitting (as discussed hereinafter with reference to FIGS. 4 to 7), without any requirement of press fitting or other tight fitting thereto. As used in the claims, the term "screws", used for the attachment of the races to the axle and wheel, is meant to include bolts. The removal and replacement of a worn out cartridge bearing 10 may be advantageously reduced from perhaps 6 hours to as little as perhaps 20 minutes for great savings in outage and labor costs. The provision of cylindrical rolling elements 18 for radial load and spherical rolling elements 20 for axial or thrust load advantageously allows the cartridge bearing 10 to have longer life, for example, a life which is on the order of 2 to 4 times that of bearings having tapered (conically-shaped) rolling elements.

The wheel bearings of sinter or pellet cars are subjected to high temperatures (i.e., in the range of about 250 to 650 degrees F.), and such high temperature melts the grease, causing it to come out of the bearing, or bakes the grease out, undesirably requiring the bearings to be frequently serviced to replenish the grease. The grease also often becomes contaminated requiring bearings to have to be frequently taken apart, repacked with fresh grease, and reassembled. Since the bearing cartridge 10 is built so as not to be taken apart (for cleaning and repacking with grease or otherwise) during its useful life, a bearing cartridge 10 for high temperature applications such as sinter or pellet car wheel bearings must be provided with a lubricant which can withstand during its useful life the high temperatures to which it is normally subjected and which does not become contaminated so as to require re-packing. Thus, in order to make a sinter or pellet car wheel cartridge bearing a reality, in accordance with the present invention, a high temperature solid lubricant, illustrated at 80, is disposed between the inner and outer races 12 and 14 respectively, as discussed hereinafter, to lubricate the relatively moving surfaces of the bearing 10. As used herein and in the claims, the term "solid lubricant" is defined as a lubricant which, unlike grease, is non-flowable. Solid lubricants are meant to include pastes or other precursers that solidify to form a plating or solid coating on bearing surfaces when subjected to high or ultra high temperatures or other temperatures at which the bearing is used. Thus, over the normal life of the bearing, the solid lubricant does not melt, bake out, or otherwise unduly break down so that it ceases to function as a lubricant at high temperature (when provided for high temperature applications) or ultra high temperature (when provided for ultra high temperature applications).

A preferred high temperature solid lubricant is composed of graphite, for example, the Cobra solid lubricant for high temperature application marketed by Unique Technologies Associates of Staten Island, N.Y.

Prior to assembly, the rolling elements 18 and 20 and inner and outer surfaces respectively of the outer and inner races 14 and 12 respectively are coated with a wax coating to keep the solid lubricant 80 spaced from these relatively movable parts. In order to assemble the cartridge bearing 10, the inner race 12 is placed on a table with its flat portion 24 up, and a plurality of the spherical elements 20 are inserted in the trough 40. The cylindrical elements 18 are then inserted in the troughs 32, aided by grease if grease is to be used as the lubricant or aided by other suitable means such as rubber bands which are later cut and removed. The outer race 14 is then lowered into position, and the remaining spherical elements 20 inserted in trough 50. The end plate 16 is then lowered into position and the screw 60 inserted in aperture 56 and threadedly inserted in aperture 58 and tightened to hold the assembly together. A solid lubricant precurser in the form of a paste is charged in the space between the inner and outer races 12 and 14 respectively, either by forcing it in under pressure or as may otherwise be suitable, and baked to a solid form. Alternatively, the solid lubricant precurser may be formed into the appropriate shape or shapes in a mold and baked, then the solid lubricant product in the appropriate shape or shapes inserted as the rolling elements 18 and 20 are inserted. In addition to providing lubrication throughout the useful life of the bearing, the solid lubricant 80 also acts as a seal, protecting it from contaminants such as dust. The bearing cartridge is then ready for mounting to a wheel and axle, and little or no maintenance should be required during the useful life of the bearing.

Other suitable high temperature solid lubricants may be used in cartridge bearing 10. For example, it is believed that the solid lubricants disclosed in U.S. Pat. No. 5,486,052, the disclosure of which is incorporated herein by reference, may be used as high temperature solid lubricants in cartridge bearing 10. See col. 4, lines 5 to 20, thereof.

It should be understood that cartridge bearing 10 may be used for applications other than as a high temperature bearing, and, whether it is used as a high temperature bearing or for another application wherein the temperature experienced is higher or lower, the bearing may, if desired, be packed with a suitable grease in which case the cartridge bearing would be suitably provided with a grease fitting, in accordance with principles commonly known to those of ordinary skill in the art to which this invention pertains, to regularly replenish the grease. For example, for temperatures up to about 200 degrees F., WC 64 Micropoly lubricant sold by SKF Bearing Co., having a location at Philadelphia, Pa., may be used.

U.S. Pat. Nos. 4,906,110; 6,007,251; 6,020,072; 5,988,891; 5,507,961; and 5,520,467, the disclosures of which are incorporated herein by reference, also disclose solid lubricants which it is believed may be suitable for use in cartridge bearing 10.

Referring to FIGS. 4 to 7, there is shown generally at 100 a pair of cartridge bearings mounted on an axle 102 for a furnace car wheel 104. Each bearing 100 includes an inner race 106, an outer race 108, and a pair of circumferential rows of rolling elements 110 generally in line contact one with another. The non-rotatable axle 102 is suitably mounted in or anchored by a pair of structural members 112 of the furnace car, which will normally have between 4 and 40 such wheels mounted thereto.

Figure 4:
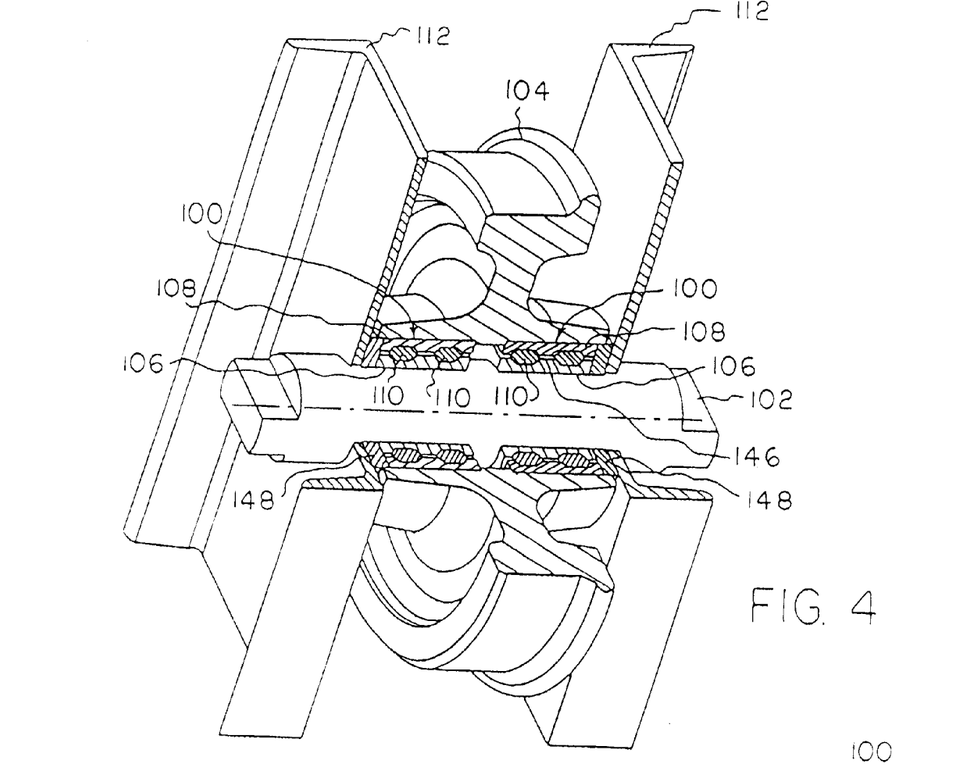
FIG. 4 is a perspective view with a portion removed for clarity of illustration of a bearing in accordance with an alternative embodiment of the present invention mounted to a wheel and axle of a furnace car.
Figure 7:
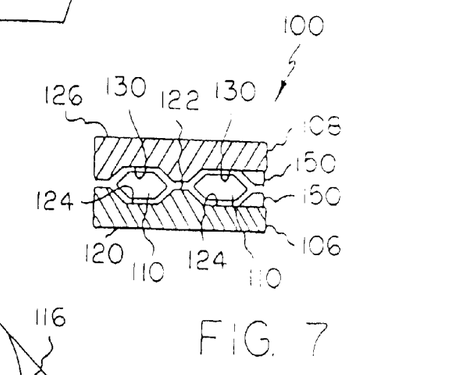
FIG. 7 is a sectional view thereof taken along lines 7—7 of FIG. 6.

The races 106 and 108 and rolling elements 110 are composed of a material, for example, H13 steel, which can withstand the ultra high temperature in a furnace. Such a material is very expensive. In order to maximize the number of bearings 100 which can be made from a given amount of material so as to reduce manufacturing cost as well as to minimize bearing size, both races 106 and 108 are cut concentrically from a single stock of material, and no other metal parts are required other than the rolling elements 110.

Figure 5:
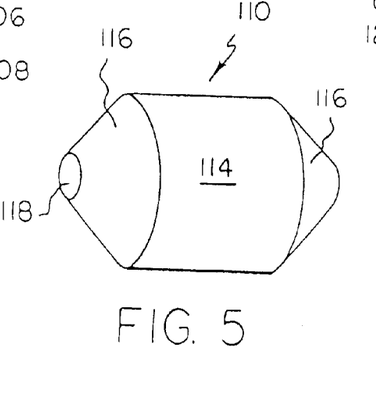
FIG. 5 is an enlarged perspective view of one of the rolling elements of the bearing of FIG. 4.
Figure 6:
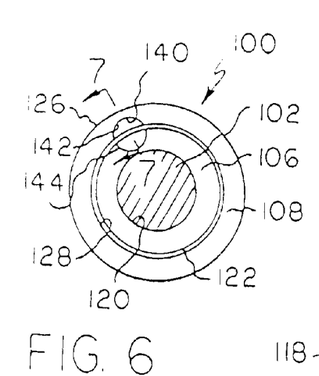
FIG. 6 is an end view of the bearing of FIG. 4.

As discussed for bearing 10, tapered (conically shaped) rolling elements for bearing both radial and axial loads tend to wear out quickly when subjected frequently to high axial shocks due to the difficulty of tapered rolling elements handling such shocks. The combination of cylindrical and spherical elements requires many moving parts and results in a large size bearing which, made of ultra high temperature metal, would be very expensive. Referring to FIG. 5, in order to better handle axial loads in both axial directions for increased bearing life as well as to maintain minimum bearing size and minimize manufacturing cost, each of the rolling elements 110, which may be called a "slanted end" rolling element, has a cylindrical central portion 114 for bearing radial loads and a pair of tapered or conically-shaped end portions 116 for bearing axial loads in both axial directions respectively. For example, each end portion 116 may taper at an angle of about 45 degrees and may desirably terminate in a flat (not pointed) end 118.

Each inner race 106 has an inner cylindrical surface 120, through which the axle 102 is slip fit, and an outer surface 122. The outer surface 122 is generally cylindrical with a pair of circumferentially extending indents or troughs 124 which are shaped complementary to the shapes of the rolling elements 110 so as to nest the rolling elements 110 therein.

Each outer race 108 has an outer cylindrical surface 126, the wheel 104 being slip fit over the outer race 108, and an inner surface 128. The inner surface 128 is generally cylindrical with a pair of circumferentially extending indents or troughs 130 which are shaped complementary to the shapes of the rolling elements 110 so that, along with troughs 124, the rolling elements 110 are nested therein, as illustrated in FIGS. 4 and 7.

The bearing cartridge 100 is constructed so as not to be taken apart. In order to position the rolling elements between the inner and outer races 106 and 108 respectively, in accordance with the present invention, a feeder slot, illustrated at 140, is provided in each axial side of the bearing 100 (only the feeder slot in one axial side shown, the feeder slot in the other axial side being spaced circumferentially from the feeder slot shown, but it need not be spaced circumferentially therefrom). The feeder slot 140 comprises a bore which has a diameter greater than the diameter of cylindrical portion 114 and extends from the respective bearing axial side to the center of the respective troughs 124 and 130 to allow a rolling element 110 to be pushed end-wise through the feeder slot 140 to nest in the troughs 124 and 130 and from there is movable circumferentially away from the feeder slot 140 as other rolling elements 110 are fed into feeder slot 140. The feeder slot 140 comprises a semi-cylindrical bore 142 in the inner surface 128 of the outer race 108 and a mateable semi-cylindrical bore 144 in the outer surface 122 of the inner race 106.

In order to assemble the cartridge bearing 100, the inner and outer races 106 and 108 respectively are held with the semi-cylindrical bores 142 and 144 in mating relationship with each other, and the rolling elements 110 are inserted end-wise one after the other with each being allowed to move circumferentially within its troughs 124 and 130 to make way for the other rolling elements. After assembly of the cartridge bearing, relative circumferential movement between the inner and outer races 106 and 108 respectively releases the mating relationship between the semi-cylindrical bores 142 and 144 so that there no longer is a bore 140 for passage of the rolling elements 110 out of the bearing 100, and the chances of the bore 140 being formed long enough for escape of a rolling element 110 are very remote. Moreover, a suitable seal, illustrated at 150, along with a suitable retaining ring (not shown) is preferably provided within each of the semi-cylindrical bores 142 and 144 to thus further prevent escape of rolling elements 110.

If it is desired that the bearing 100 have a high temperature application such as for a sinter car wheel, then the previously discussed Cobra solid lubricant precurser may be forced into the bearing under pressure and solidified similarly as described for bearing 10 to form solid lubricant 80, and solid lubricant 80 may also desirably be provided in the semi-cylindrical bores 142 and 144, instead of insert 150, to both seal and lubricate.

The wheel bearings of furnace cars (except, as previously discussed, cars for bottom wall furnaces) are subjected to ultra high temperatures (i.e., in the range of about 700 to 1100 degrees F.), and the Cobra solid lubricant discussed above has so far been found inadequate for such Jtra high temperatures. In accordance with the present invention, a ultra high temperature lubricant (i.e., a lubricant which does not melt or bake out but remains in viable form at ultra high temperatures for prolonged periods of time), illustrated at 146, is provided to lubricate the relatively moving surfaces of the bearing 10. Preferably, the ultra high temperature lubricant 146 is a lithium-based graphite and molybdenum lubricant such as a lubricant sold under the NEVER-SEEZ brand by Bostik, Inc. of Middletown, Mass. However, other suitable bases for the lubricant may be used. The lubricant in the form of a paste is charged into the bearing. Under ultra high temperatures, the base is burned lubricating away with the result that the graphite and molydenum lubricating components are plated onto the bearing surfaces. Thus, lubricant 146 is a solid lubricant which is expected to remain viable for the life of the bearing. Therefore, a grease fitting may not be needed for the bearing. However, if desired, a grease fitting may be provided to replenish the lubricant 146 as necessary or to periodically charge the bearing 10 or bearing 100 with a low or high temperature grease for use thereof in low or high temperature applications (in which event, the grease used should be compatible with any solid lubricant previously used in the bearing).

Spacer rings 148 are desirably slip fit on the axle 102 to be positioned between each cartridge bearing 100 and the respective structural member 112 to prevent the rotating wheel 104 from contacting the structural members 112.

When the cartridge bearing 100 is worn out, it is replaced by simply slipping the inner race 106 and spacer ring 148 off the axle 102 and slipping the wheel 104 off the outer race 108, then slipping the wheel 104 over the outer race 108 of the new cartridge bearing 100 and slipping the inner race 106 of a new cartridge bearing and spacer ring 148 over the axle 102, a process which may take perhaps only 20 minutes as compared to perhaps 6 hours for the assembling and mounting of conventional bearings in the field.

It should be understood that each of the bearing cartridges 10 and 100 may be used in either high temperature, ultra high temperature, or low temperature applications, and the lubricant used may be as suitable for the application. Thus, if bearing cartridge 10 is provided for a furnace car, solid lubricant 146 may be used therewith, and if bearing cartridge 100 is provided for a sinter car, solid lubricant 80 may be used therewith. For temperatures up to about 400 degrees F., either of the bearings 10 or 100 may be provided with a lubricant paste composed of Teflon material, the lubricant being injected as a liquid and forming in the bearing into a paste. Although such a paste is considered a permanent lubricant, the bearing may have to be re-lubricated. Thus, the bearing would desirably contain suitable fittings for re-lubrication thereof. It should also be understood that each of the bearing cartridges 10 and 100 may be used with apparatus other than sinter or furnace cars or other cars and may be attached to wheels and axles or other apparatus by screws (as illustrated for bearing 10), slip fits (as illustrated for bearing 100), or other suitable means. It should further be understood that other types of rolling elements may be provided in either of the bearing cartridges 10 and 100. For example, bearing cartridge 100 may, if desired, contain spherical rolling elements.

By providing a bearing cartridge which is constructed so as not to be disassembled but can instead be quickly and easily replaced along with a suitable lubricant for the temperature environment of the bearing cartridge, the costs in down time and with maintaining the bearings may be substantially reduced for more efficient plant operation.

It should be understood that, while the invention has been described in detail herein, the invention can be embodied otherwise without departing from the principles thereof, and such other embodiments are meant to come within the scope of the present invention as defined by the appended claims.

What is claimed is:

1. In combination with a wheel and axle of conveyance apparatus, a bearing for providing relative rotation between the wheel and the axle, the bearing comprising an inner member having a bore for receiving the axle and an outer surface defining an inner race, an outer member attachable to the wheel and having an inner surface defining an outer race, a plurality of rolling elements disposed for bearing load between said inner and outer races, said inner and outer members and said rolling elements assembled together as a unit, said inner and outer members each having a thickness to provide sufficient rigidity that a tight fit is not required between said inner and outer members and the axle and wheel respectively to support said inner and outer members for bearing the load thereof whereby the assembled unit is self-supporting when attached to the axle and the wheel for relative rotation therebetween thereby defining a cartridge, a high temperature or ultra high temperature solid lubricant between said races, the axle being loosely received in said inner member bore and rigidly detachably attached to said inner member, and said outer member being loosely received in the wheel and rigidly detachably attached thereto whereby said inner and outer members are detachably attachable to the axle and the wheel respectively for replacement of the cartridge without disassembling the cartridge.

2. A combination according to claim 1 wherein said lubricant is a solid lubricant.

3. A combination according to claim 1 wherein said solid lubricant is composed of graphite and molybdenum.

4. A combination according to claim 1 wherein said rolling elements comprise a plurality of cylindrical rolling elements disposed for bearing radial load and a plurality of ball-shaped rolling elements disposed for bearing axial load.

5. A combination according to claim 1 wherein said rolling elements have cylindrical central portions and conically shaped end portions.

6. A combination according to claim 1 wherein said outer member has an outer diameter which is less than 8 inches and wherein the thickness of a radial load bearing portion of each of said inner member and said outer member is at least ½ inch.

7. A combination according to claim 1 wherein said inner member has a plate portion closing one end of said bore and positioned to engage an end of the axle in abutting relation therewith with a respective end portion of the axle received within said bore, the bearing further comprising an end cap detachably attached to said plate portion for holding said inner and outer members and said rolling elements together.

8. A combination according to claim 7 wherein said inner member and said end cap have radially outer portions respectively between which said outer member is rotatably fixed.

9. In combination with a wheel and axle of conveyance apparatus, a bearing for providing relative rotation between the wheel and the axle, the bearing comprising an inner member having a bore for receiving the axle and an outer surface defining an inner race, an outer member attachable to the wheel and having an inner surface defining an outer race, a plurality of rolling elements disposed for bearing load between said inner and outer races, said rolling elements comprising a plurality of cylindrical rolling elements disposed for bearing radial load and a plurality of ball-shaped rolling elements disposed for bearing axial load, said inner and outer members each having a thickness to provide sufficient rigidity that a tight fit is not required between said inner and outer members and the axle and wheel respectively to support said inner and outer members for bearing the load thereof whereby the assembled unit is self-supporting when attached to the axle and the wheel for relative rotation therebetween thereby defining a cartridge, said inner member further having a plate portion closing one end of said bore and positioned to engage an end of the axle in abutting relation therewith with a respective end portion of the axle received within said bore, the axle being loosely received in said inner member bore and rigidly detachably attached to said inner member, and said outer member being loosely received in the wheel and rigidly detachably attached thereto whereby said inner and outer members are detachably attachable to the axle and the wheel respectively for replacement of the cartridge without disassembling the cartridge.

10. A combination according to claim 9 further comprising an end cap detachably attached to said plate portion for holding said inner and outer members and said rolling elements together as an assembled unit.

11. A combination according to claim 9 further comprising a high temperature or ultra high temperature solid lubricant between said races.

12. In combination with a wheel and axle of conveyance apparatus, a bearing for providing relative rotation between the wheel and the axle, the bearing comprising an inner member having a bore for receiving the axle and an outer surface defining an inner race, an outer member attachable to the wheel and having an inner surface defining an outer race, said outer member having an outer diameter which is less than 8 inches, each of said inner and outer members having a radial load bearing portion, and a plurality of rolling elements disposed for bearing load between said inner and outer races, said inner and outer members and said rolling elements assembled to define an assembled unit, wherein the thickness of said radial load bearing portion of each of said inner and outer members is at least ½ inch to provide sufficient rigidity that a tight fit is not required between said inner and outer members and the axle and wheel respectively to support said inner and outer members for bearing the load thereof whereby the assembled unit is self-supporting when attached to the axle and the wheel for relative rotation therebetween thereby defining a cartridge, the axle being loosely received in said inner member bore and rigidly detachably attached to said inner member, and said outer member being loosely received in the wheel and rigidly detachably attached thereto whereby said inner and outer members are detachably attachable to the axle and the wheel respectively for replacement of the cartridge without disassembling the cartridge.

13. A combination according to claim 12 further comprising a solid lubricant between said races.

14. A combination according to claim 12 wherein said rolling elements comprise a plurality of cylindrical rolling elements and a plurality of ball-shaped rolling elements.

15. A combination according to claim 12 further comprising a high or ultra high temperature solid lubricant between said races.

16. A combination according to claim 12 further comprising screws for detachably attaching said inner and outer members to the axle and the wheel respectively.

17. A bearing for providing relative rotation between an operating member and an axle, the bearing comprising an inner member having a bore for receiving the axle and an outer surface defining an inner race, an outer member attachable to the operating member and having an inner surface defining an outer race, a plurality of rolling elements disposed for bearing load between said inner and outer races, said rolling elements comprising a plurality of cylindrical rolling elements disposed for bearing radial load and a plurality of ball-shaped rolling elements disposed for bearing axial load, said inner and outer members each having a thickness to provide sufficient rigidity that said inner and outer members need not be tightly bound to the axle and operating member respectively for bearing the load thereof whereby the assembled unit is self-supporting when attached to the axle and operating member for relative rotation therebetween thereby defining a cartridge, said inner member further having a plate portion closing one end of said bore and positioned to engage an end of the axle in abutting relation therewith with a respective end portion of the axle received within said bore, and said inner and outer members being detachably attachable to the axle and the operating member respectively without disassembling the cartridge, wherein said inner member has a radially-outwardly extending portion, the bearing further comprising an end cap, said ball-shaped rolling elements comprising a first plurality of ball-shaped rolling elements disposed between said outer member and said inner member radially-outwardly extending portion and a second plurality of ball-shaped rolling elements disposed between said outer member and said end cap, and means for attaching said end cap to said inner member plate portion for holding said inner and outer members and said rolling elements together.

* * * * *